(No Model.)

E. H. JOHNSON.
ELECTRIC CURRENT REGULATOR.

No. 435,899. Patented Sept. 2, 1890.

Witnesses
E. C. Rowland
William Pelzer

Inventor
Edward H. Johnson,
By his Attorneys Dyer & Seely.

UNITED STATES PATENT OFFICE.

EDWARD H. JOHNSON, OF NEW YORK, N. Y.

ELECTRIC-CURRENT REGULATOR.

SPECIFICATION forming part of Letters Patent No. 435,899, dated September 2, 1890.

Application filed October 19, 1887. Serial No. 252,803. (No model.)

*To all whom it may concern:*

Be it known that I, EDWARD H. JOHNSON, of New York city, in the county and State of New York, have invented a certain new and useful Improvement in Electric-Current Regulators, of which the following is a specification.

The object of my invention is to produce a simple and efficient apparatus for adjusting a resistance or other electric-current-varying device, which may be the resistance in the field-circuit of a dynamo-electric machine or in a feeder of a light or power system. The apparatus is designed particularly for use in connection with multiple-arc systems or circuits. It overcomes to a great extent the fluctuations back and forth which are incident to the operation of apparatus heretofore employed for this purpose.

The invention consists in the several novel devices and combinations, as fully hereinafter explained, and pointed out by the claims.

Figure 1:
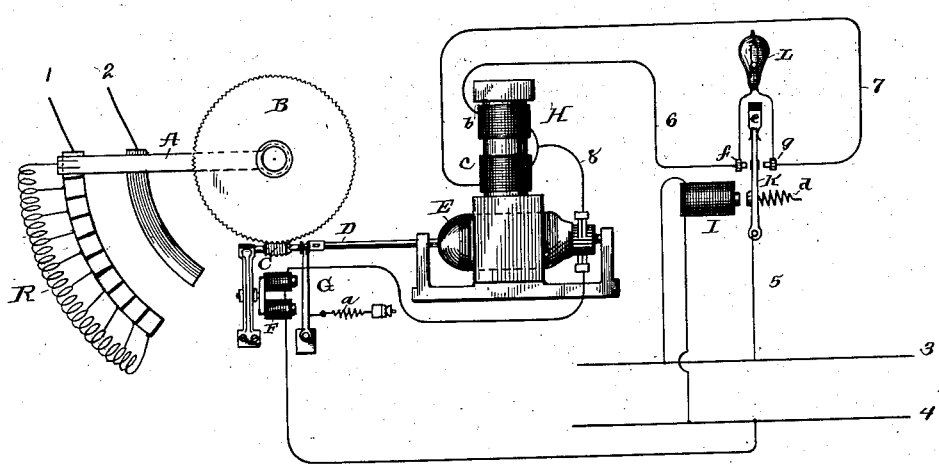
Figure 2:
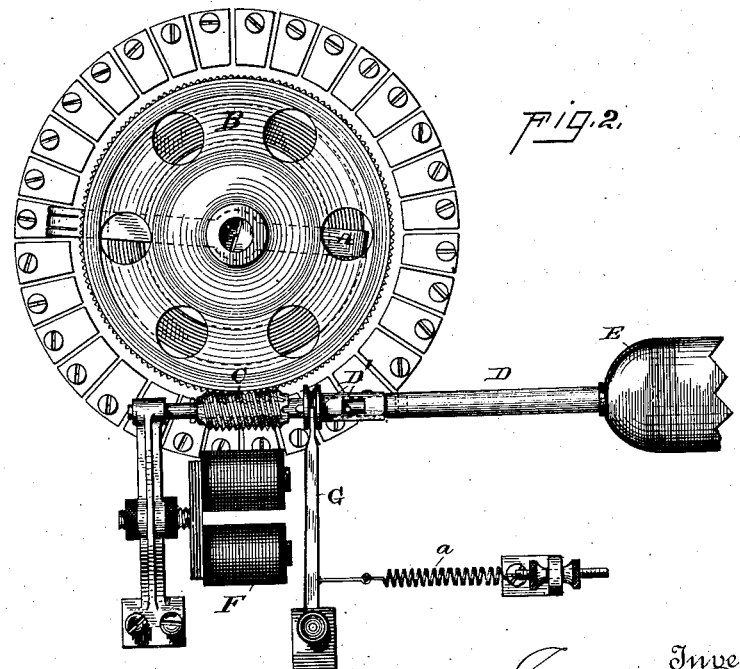

In the accompanying drawings, forming a part hereof, Figure 1 is a view principally in diagram of an apparatus embodying my invention, and Fig. 2 a view, on a larger scale, illustrating in particular the devices for disconnecting the resistance-adjusting wheel from the operating electric motor.

The resistance R is adapted to be thrown into and out of the circuit 1 2, which may be the field-circuit of a dynamo-electric machine supplying current to the circuit 3 4, or it may be a feeding-circuit of a system of which the circuit 3 4 is a part. The resistance-adjusting arm A is fixed to a shaft carrying a worm-wheel B. This worm-wheel engages with and is driven by a worm C, which is sleeved to turn loosely on the shaft D. The shaft D is the shaft of the motor-armature E or is coupled therewith. It carries a sliding clutch-sleeve D', which engages the worm C and locks it to the shaft when it is drawn against said worm.

F is an electro-magnet whose armature G engages by a fork the sliding clutch-sleeve. This armature is retracted by a spring $a$, so that when the magnet F is not energized the spring $a$ will draw the armature and clutch-sleeve back and disconnect the work from the motor-shaft, while the attraction of the armature G by the magnet F will lock the worm to the motor-shaft and cause it to turn therewith.

The field-magnet H of the motor is provided with reverse windings $b$ $c$, a current passing through one winding causing the motor to run in one direction, while a current through the other winding causes it to run in the opposite direction.

I is the controlling-pressure magnet connected in multiple arc with the conductors 3 4. Its armature K is balanced between the attractive force of the magnet and the retractive force of the spring $d$ when the pressure is normal. Centering-springs $e$ tend to keep the armature K in a central position, as will be well understood, and out of contact with the front and back limit-stops $f$ $g$.

The circuit-connections for controlling the motor and the magnet F are as follows: From conductor 3 of the multiple-arc system or circuit by wire 5 to the controlling-armature K. At the limit-stops $f$ $g$ the circuit is divided, the wire 6 from the front stop $f$ running to the winding $b$ of the motor field-magnet, while the wire 7 from the back stop $g$ runs to the reverse winding $c$. On the other side of the windings $b$ $c$ the circuit unites into one part 8, which runs through the motor-armature and the magnet F back to the other conductor 4 of the multiple-arc system or circuit. Now it will be seen that when the armature K touches either stop $f$ or $g$ the circuit through the motor and the clutch-magnet will be closed, and the motor will run in one direction or the other, according to which limit-stop is touched, while the clutch-magnet will connect the worm with the motor-shaft and the resistance will be adjusted. As soon as the armature of the pressure-magnet leaves the limit-stop and resumes its central or balanced position the clutch-magnet will release its armature, which will be drawn back by its retracting-spring, and the worm will thereby be disconnected from the motor-shaft, preventing the further movement which the motor will be given, by reason of its acquired momentum, from carrying the resistance-adjusting arm with it. Thus the fluctuations incident to apparatus heretofore employed will be avoided. To absorb the spark, which would be caused at the limit-stops $f$ $g$ by the discharge of the field-magnet of the motor, I connect such limit-stops by a high resistance, which may be an incandescent electric lamp L.

It will be understood that the gearing between the motor-shaft D and the resistance-adjusting arm A will be so proportioned relative to the speed of the motor and the rate of magnetic charge and discharge of the field-magnet of the dynamo to be regulated that the resistance will be introduced into or cut out of the field-circuit of such dynamo at a rate to which such field-magnet can readily respond. Hence the fluctuations caused by introducing or cutting out an excessive amount of resistance due to the working of the regulator at a greater rate than the rate of magnetic charge and discharge of the dynamo field-magnet will be obviated.

What I claim is—

1. In an electric-current regulator, the combination, with a pressure-magnet, of an electric motor controlled thereby, a current-varying device operated by such motor, and a clutch-magnet also controlled by the pressure-magnet and acting to connect and disconnect the motor and the current-varying device, substantially as set forth.

2. In an electric-current regulator, the combination, with a pressure-magnet, its armature, and limit-stops, of an electric motor having reverse field-windings connected with and controlled at such limit-stops, a current-varying device operated in one direction or the other by such motor under the control of such pressure-magnet, and a clutch-magnet located in circuit with the motor and acting to connect and disconnect the motor and the current-varying device, substantially as set forth.

3. In an electric-current regulator, the combination, with the controlling pressure-magnet and the operating electric motor, of the worm sleeved on the motor-shaft, the worm-wheel connected with a resistance-adjusting arm, the clutch-magnet, and the clutch-sleeve sliding on the motor-shaft and moved by the clutch-magnet to connect and disconnect such shaft and the worm sleeved thereon, substantially as set forth.

4. In an electric-current regulator, the combination, with the controlling pressure-magnet and its lever and limit-stops, of the electric motor having reverse field-windings controlled at such limit-stops and connected with and operating a resistance-adjusting arm, and a shunt of high resistance connecting said limit-stops, substantially as set forth.

This specification signed and witnessed this 5th day of October, 1887.

EDWD. H. JOHNSON.

Witnesses:
WILLIAM PELZER,
E. C. ROWLAND.